US012007028B2

(12) United States Patent
Romanin

(10) Patent No.: US 12,007,028 B2
(45) Date of Patent: Jun. 11, 2024

(54) BULK UNLOADER FOLLOWER SEAL

(71) Applicant: NORDSON CORPORATION, Westlake, OH (US)

(72) Inventor: Mario Romanin, Amherst, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 16/769,615

(22) PCT Filed: Dec. 3, 2018

(86) PCT No.: PCT/US2018/063574
§ 371 (c)(1),
(2) Date: Jun. 4, 2020

(87) PCT Pub. No.: WO2019/112938
PCT Pub. Date: Jun. 13, 2019

(65) Prior Publication Data

US 2020/0318739 A1 Oct. 8, 2020

Related U.S. Application Data

(60) Provisional application No. 62/596,634, filed on Dec. 8, 2017.

(51) Int. Cl.
*F16J 1/00* (2006.01)
*B65D 83/00* (2006.01)
*F16J 15/32* (2016.01)

(52) U.S. Cl.
CPC .......... *F16J 15/32* (2013.01); *B65D 83/0005* (2013.01); *F16J 1/00* (2013.01)

(58) Field of Classification Search
CPC .. F16J 1/00; F16J 15/32; F04B 53/143; F04B 53/148; F04B 15/02; B67D 7/645; B65D 83/0005
See application file for complete search history.

(56) References Cited

U.S. PATENT DOCUMENTS 2,630,248 A * 3/1953 Hinz .................... B67D 7/0227 222/320
3,247,767 A * 4/1966 Aslan .................... F15B 15/223 91/26

(Continued)

FOREIGN PATENT DOCUMENTS

DE 202013004757 U1 7/2014

*Primary Examiner* — Grant Moubry
(74) *Attorney, Agent, or Firm* — BakerHostetler

(57) ABSTRACT

A pump follower for use in a container storing a material includes a body configured to be inserted into the container, the body having a material contacting surface configured to contact the material in the container and a peripheral surface substantially perpendicular to the material contacting surface. A groove is defined on the peripheral surface of the body and a sealing element is disposed in the groove and configured to slidably contact the container. The sealing element has a channel defined within, where the sealing element is configured to be compressed when the pump follower is inserted into the container, such that the channel decreases in size. A sealing element for use with a pump follower is also disclosed. The sealing element has a body has an outer surface, a first side, and a second side, and a channel defined within the sealing element body.

23 Claims, 3 Drawing Sheets

FIG. 3B

(56) References Cited

U.S. PATENT DOCUMENTS 3,282,469 A * 11/1966 Skonberg ................ F16N 37/00 222/386
3,785,253 A * 1/1974 Sandau ...................... F16J 1/10 92/181 R
4,073,409 A * 2/1978 Gardner .............. B05C 11/1042 222/260
4,195,755 A * 4/1980 Slautterback ....... B05C 11/1042 219/230
4,227,069 A * 10/1980 Gardner ................ B29B 13/022 219/214
4,592,491 A * 6/1986 Chollet ................... B05C 11/10 417/313
4,601,235 A 7/1986 Roberts
5,257,723 A * 11/1993 Bagung .................. B67D 7/645 222/146.2
5,887,752 A * 3/1999 Strother ............... B67D 7/0244 222/1
5,960,700 A * 10/1999 Staggs ................. F16J 15/3236 92/240
5,971,211 A 10/1999 Farley et al.
6,003,732 A * 12/1999 Farley ...................... B67D 7/80 222/146.5
6,102,251 A * 8/2000 Strother ............... B67D 7/0244 141/65
7,954,823 B2 * 6/2011 Horie ..................... F16J 15/164 277/436
9,482,211 B2 * 11/2016 Chacko ...................... F16J 9/12
10,882,734 B2 * 1/2021 Enderle ................... B05C 11/11
2001/0025864 A1 10/2001 Meyer
2008/0023082 A1 1/2008 Schucker
2011/0064587 A1 * 3/2011 Hoversten ............. F04B 23/028 417/53
2016/0018002 A1 * 1/2016 Lenhert ................ F16J 15/3212 277/540
2016/0178054 A1 * 6/2016 Tsuji ..................... C23C 14/325 277/442

* cited by examiner

BULK UNLOADER FOLLOWER SEAL

CROSS REFERENCE TO RELATED APPLICATIONS

This application is a U.S. National Stage Application of International Patent Application No. PCT/US2018/063574, filed Dec. 3, 2018, which claims the benefit of U.S. Provisional Patent App. No. 62/596,634, filed Dec. 8, 2017, the entire disclosures of both of which are hereby incorporated by reference as if set forth in their entireties herein.

TECHNICAL FIELD

The present disclosure generally relates to pump followers for removing material from a container, and specifically to follower seals for wiping viscous material on the sides of the container.

BACKGROUND

Pump followers used in conjunction with pumps to remove viscous material from containers may generally include a circular plate or platen coupled to the inlet end of a pump. Such followers are inserted into the open end of a drum, barrel, or other container of highly viscous material. The viscous material is often stored in 55-gallon drums. The platen is driven toward the bottom of the drum and the viscous material is thereby forced into a cavity on the bottom side of the platen and through a pump intake passage in the center of the platen. The material is then pumped to a suitable dispenser.

There are shortcomings with the conventional pump followers. First, significant waste can occur as the pump follower is unable to capture all of the material within the drum. It is estimated that as much as 2-3 gallons of material per 55 gallon barrel can be lost due to this inefficiency. In a large scale operation, this translates into substantial material loss. Further, the leftover or residual material at the bottom of the drum can pose disposal problems.

Therefore, there is a need for an improved seal capture more, if not all, of the material within a drum.

SUMMARY

The foregoing needs are met by the various embodiments of followers and follower seals disclosed. In one embodiment, a pump follower for use in a container storing a material includes a body configured to be inserted into the container. The body has a material contacting surface configured to contact the material in the container and a peripheral surface substantially perpendicular to the material contacting surface. A groove is defined on the peripheral surface of the body. A sealing element is disposed in the groove and configured to slidably contact the container, and a channel defined within the sealing element. The sealing element is configured to be compressed when the pump follower is inserted into the container, such that the channel decreases in size.

According to another embodiment, a sealing element for use with a pump follower includes a body having an outer surface, a first side, and a second side. The sealing element also includes a channel defined within the body. The channel has an opening defined on the outer surface of the sealing element between the first side and the second side, a floor opposite the opening, a first wall extending from the floor to the opening, and a second wall opposite the first wall extending from the floor to the opening. The sealing element is configured to be compressed when the pump follower is inserted in a container such that the first side moves closer to the second side and the channel decreases in size.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In the drawings.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Disclosed are embodiments of pump followers and pump follower seals. Material that is stored in a container needs to be removed and transferred from the container to a destination. For exemplary purposes, the container can be generally cylindrical, for example a 55-gallon drum, which is commonly used to transport liquid and viscous materials. It will be understood that the present disclosure is not limited to a particular container shape, size, or volume, and it is not limited to a specific material.

To facilitate removal of material from the container, a follower is inserted into the container. In some embodiments, the follower may include a pump configured to move material from the container, through the follower, and to a destination. The follower may have a mechanism for collecting as much of the material in the container as possible using, for example a wiper seal that contacts the inside of the container. This helps decrease the amount of material that remains in the container, which leads to decreased waste and lower material costs. Improved material removal additionally reduces the risk of contamination between uses and helps keep the container and work environment clean.

The pump follower is typically moved into the container by a mechanical pressure generator, for example a pneumatic cylinder. As the force necessary to insert the follower into the container increases, so does the size and power of the pneumatic cylinder. Having smaller and less powerful cylinders may be beneficial to reduce the size of the assembly, lower the energy requirements for use, and decrease the cost of purchasing or manufacturing the cylinders.

Figure 1:
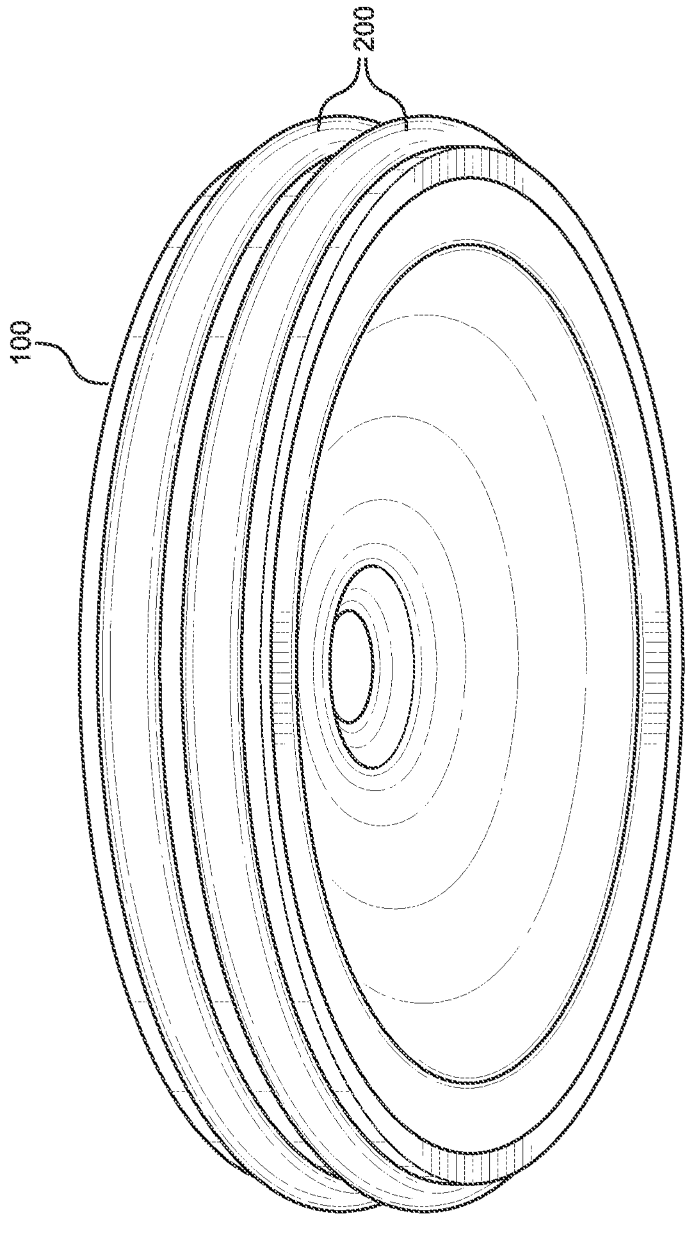
FIG. 1 illustrates an isometric view of a follower in accordance with an embodiment.
Figure 2:
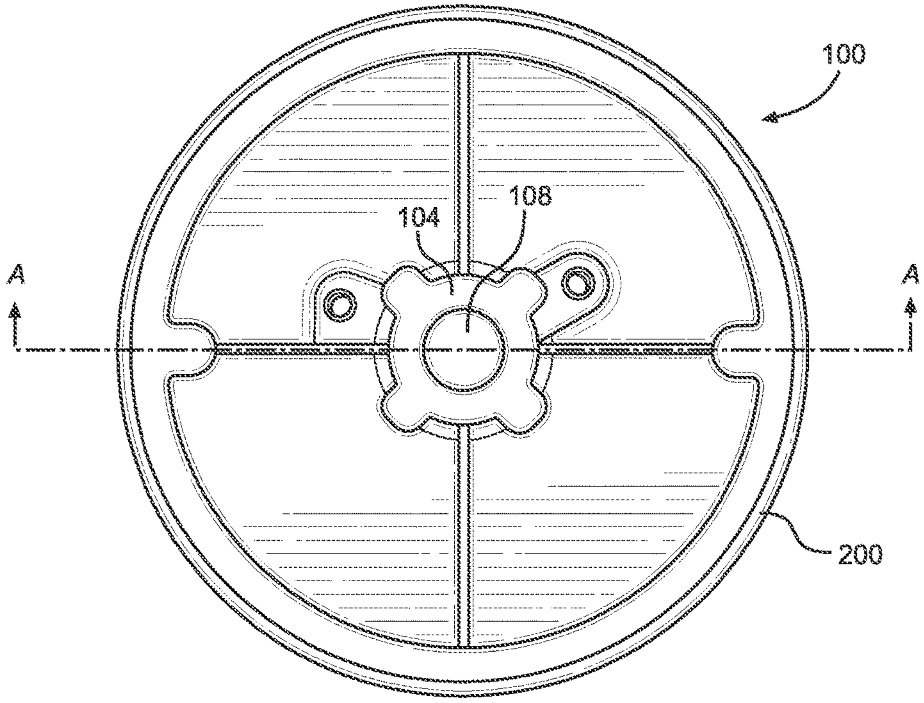
FIG. 2 illustrates a top perspective view of a follower in accordance with an embodiment.

Referring to FIGS. 1 and 2, an exemplary pump follower 100 is shown having a generally cylindrical shape and a circular cross-section. FIGS. 1 and 2 depict a pump follower 100 having two follower seals 200, but it will be understood that a different number of follower seals may be utilized. For example, in some embodiments, a pump follower 100 may include one or more follower seals 200. All of the follower seals 200 may be the same, or they may differ in size, shape, cross-section, density, material, or another characteristic of a seal. For example, the follower seal 200 at the bottom of the pump follower 100 may have a smaller diameter than the follower seal at the top of the pump follower 100.

Figure 3A:
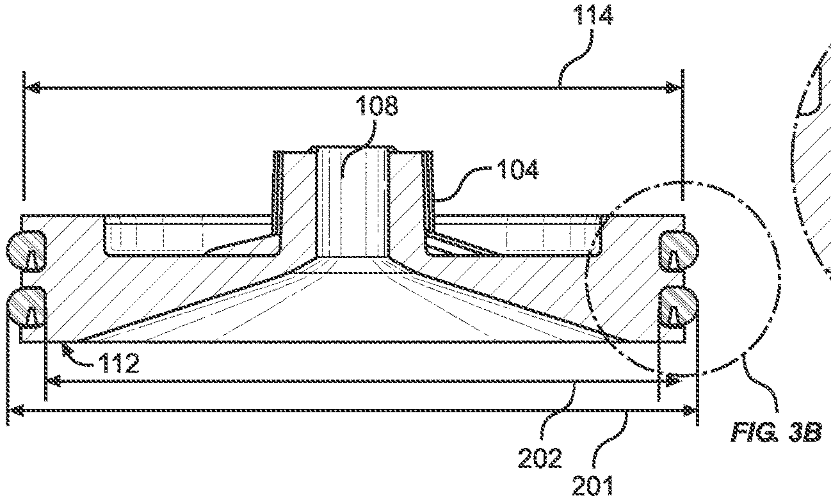
FIG. 3A illustrates a cross-sectional view along the A-A line of the follower shown in FIG. 2.

In some embodiments, the pump follower 100 may include elements for removing material from within the container, for example a pump, vacuum, or another suitable means of moving material. As shown in FIGS. 2 and 3A, the pump follower 100 may include a tool interface 104 configured to attach to a suitable tool, for example a pump or a material dispenser. The tool interface 104 defines a passage 108 through which material can move. The movement of material may be active, such as via a pumping or suctioning mechanism, or it may be passive, such that material is guided into the passage 108 as the pump follower 100 is further inserted into the container. It will be understood that various mechanisms of removing material from the container exist and that this disclosure is not limited to any particular approach.

The pump follower 100 has a material contacting surface 112 that is configured to face and contact the material within the container during insertion and use. A side surface 116 is generally perpendicular to the material contacting surface 112 and extends radially around the body of the pump follower 100. The follower seal 200 may be engaged with the pump follower 100 to maintain contact with the inside walls of the container during insertion and progression of the pump follower 100. In some embodiments, the side surface 116 defines a groove 120 extending along the pump follower 100 and configured to receive and retain the follower seal 200.

Figure 3B:
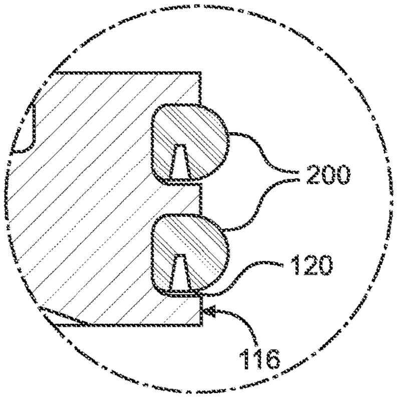
FIG. 3B illustrates a detailed view of a portion of the follower shown in FIGS. 2 and 3A.
Figure 4:
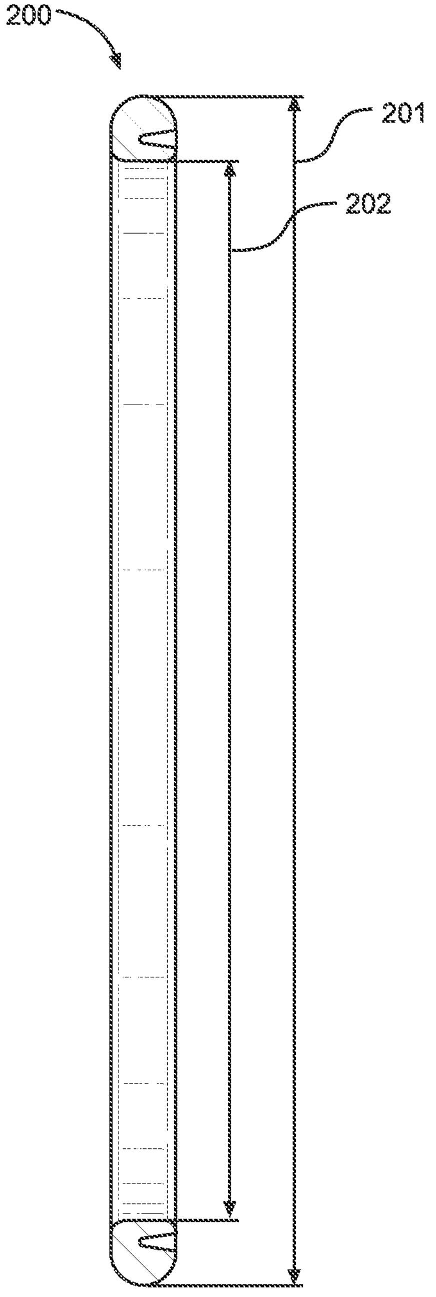
FIG. 4 illustrates a cross-sectional view of a follower seal along the A-A line.
Figure 5:
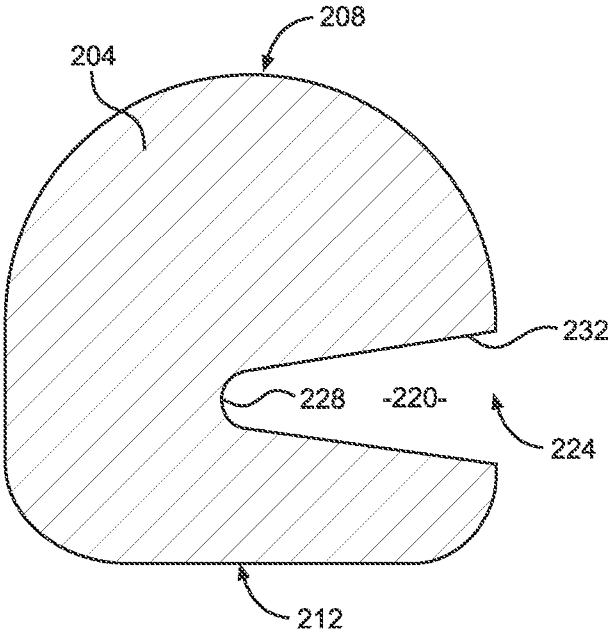
FIG. 5 illustrates a cross-sectional view of a portion of the follower seal shown in FIG. 4.

An exemplary follower seal 200 is shown in FIGS. 3-5. The follower seal 200 is substantially circular and is ring-shaped, e.g., O-ring-shaped. The follower seal 200 corresponds to the cross-sectional shape of the pump follower 100, and it will be understood that the follower seal 200 may comprise a different shape to accommodate a differently shaped pump follower 100 for a differently shaped container. For example, a pump follower 100 having an oval cross section would have a correspondingly oval follower seal 200. For the purposes of the present disclosure, the exemplary follower seal 200 will be referred to as round or ring-shaped.

The follower seal 200 has a seal body 204 having a first side 208 and a second side 212 disposed opposite the first side 208. The follower seal 200 has an outer diameter 201 and an inner diameter 202 with the seal body 204 being disposed in the space between the outer and inner diameters 201, 202. The outer diameter 201 is the measurement between two directly opposing points on the first side 208 of the seal body 204, and the inner diameter 202 is the measurement between two directly opposing points on the second side 212. The inner diameter 202 is approximately equal to the diameter of the groove 120.

The dimensions of the follower seal 200 may vary depending on necessity and/or preference. This disclosure is not limited to a particular size of the follower seal 200, and it will be understood that the features disclosed herein are scalable to adequate sizes depending on desired use. For example, the follower seal 200 may have an inner diameter between 6 inches and 30 inches, between 12 inches and 24 inches, between 16 inches and 20 inches, or various combinations of the above. In some embodiments, the inner diameter may be about 18 inches, 19 inches, 19.8 inches, or 20 inches. Similarly, the follower seal 200 of various embodiments may have an outer diameter between 4 inches and 32 inches, between 10 inches and 26 inches, between 14 inches and 22 inches, or various combinations of the above. In some embodiments, the outer diameter may be about 19 inches, 20 inches, 21 inches, or 22 inches. As with the inner and outer diameters, the height of the follower seal 200 may also vary. The follower seal 200 may be, for example, between 0.25 inches and 4 inches high, between 1 inch and 4 inches, between 1.5 inches and 3 inches, or various combinations thereof. In some embodiments, the follower seal 200 may be about 1 inch high, about 1.25 inches high, or about 1.5 inches high.

The follower seal 200 is disposed in the groove 120 defined on the side wall 116 of the follower 100. The groove 120 may be rectangular, rounded, triangular, or have another desired shape. In some exemplary embodiments shown in FIGS. 3A and 3B, the groove 120 is substantially rectangular. The follower seal 200 is introduced into the groove 120 and held in place therein. Disposing the follower seal 200 into the groove 120 helps retain the relative position of the seal on the side surface 116 of the follower 100 and prevents slipping, skewing, or dislodging of the seal during use.

The follower seal 200 may have any suitable cross-sectional shape for providing an adequate seal, such as a round, a square, a trapezoidal, L-shaped, B-shaped, and D-shaped cross section. In some embodiments of the present disclosure, the follower seal 200 is substantially D-shaped, with the first side 208 of the seal body 204 being hemispherical and the second side 212 being flat. As depicted in the exemplary embodiment of FIGS. 3A and 3B, the D-shaped follower seal 200 may be situated in the rectangular groove 120, such that the flat second side 212 of the seal body 204 contacts the corresponding flat surface of the groove 120. This arrangement provides greater contact surface between the follower seal 200 and the groove 120 than existing assemblies. The follower seal 200 is thus better secured and is less likely to rotate within the groove 120. During use, as the follower 100 moves into the container and the follower seal 200 contacts the walls of the container, shear force is applied on the follower seal 200. The increased retention of the follower seal 200 allows for greater shear forces to be applied without increasing the possibility unwanted shifting or dislodging of the follower seal 200.

The first side 208 may be a different shape from the second side 212, and may be rounded or hemispherical. A rounded end may be advantageous to slide along the interior walls of the container as the follower 100 is moved. The rounded shape provides ample contact with the interior wall while spreading out friction and shear forces effectively. Additionally, a rounded surface has fewer protrusions that can get caught on various imperfections of the container wall leading to tearing, stretching, twisting, or displacement of the follower seal 200. Moreover, a rounded first side 208 is readily recognizable in the technological field, as it resembles, in part, a standard round O-ring, which leads to increased familiarity of the product with operators during preparation and use.

The seal body 204 of the follower seal 200 may be manufactured with various protrusions or facets to better fit the desired use. In some embodiments, the seal body 204 may include a cutout or a notch, or, alternatively, a plurality of cutouts or notches, which define a channel 220 within the seal body 204. The channel 220 may extend along the entire follower seal 200. In some embodiments, multiple channels 220 may be defined in the seal body 204. All channels 220 may have the same shape and dimensions, or, alternatively, some channels 220 may have different shapes and dimensions from other channels 220.

Referring again to FIGS. 3-5, a follower seal 200 may include one channel 220 that extends along the entirety of the follower seal body 204. The channel 220 is defined within the seal body 204 by an opening 224 on the seal body 204 and is constrained by a channel floor 228 and at least two channel walls 232. While the channel 220 may be disposed in various positions along the follower seal 200, in some embodiments it may be preferable to position the channel 220 at a location between the first end 208 and the second end 212. In such arrangements, the opening 224 may disposed on the seal body 204 such that the opening 224 is not on the hemispherical first side 208 or the flat second side 212.

The follower seal 200 may include a channel 220 that can be manufactured to have many different shapes and dimensions. This disclosure is not intended to limit the channel 220 to any particular size or cross-sectional shape. Suitable cross-sectional shapes include, but are not limited to, rectangular, rounded, V-shaped, U-shaped, arched, etc. The channel walls 232 extending from the channel floor 228 to the opening 224 may be planar or curved. As shown in the illustrative embodiment of FIG. 5, the channel floor 228 may be rounded. In some embodiments, the channel floor 228 may be flat. In embodiments where the channel 220 is formed with two channel walls 232 meeting at the channel's nadir, the channel floor 228 may include only the point of contact of the two channel walls 232.

Furthermore, the cross-sectional shape of the channel 220 may be symmetrical, such that each channel wall 232 extends the same distance from the opening to the channel floor 228, and the angle of the channel wall 232 formed relative to the channel floor 228 is the same for every other channel wall 232. In alternative embodiments, the cross-sectional shape of the channel 220 may be asymmetrical, with each channel wall 232 having a different length, a different angle relative to the channel floor 228, and/or a different curvatures from any other channel wall 232. For example, an asymmetrical channel 220 may be spiral-shaped, arched, D-shaped, or another suitable shape for use in with followers.

Depending on the shape and symmetry of the channel 220, the opening 224 may be directly opposite the channel floor 228, with the entirety of the channel 220 being between the opening 224 and the channel floor 228. In some embodiments where dimensions and shapes of the channel walls 232 differ, the opening 224 may not be linearly opposite the channel floor 228. The follower seal 200 may include more than one channel 220, for example, 2, 3, 4, or another suitable quantity of channels 220. The multiple channels 220 may be adjacent one another, or they may be disposed at various portions of the seal body 204.

The dimensions of the channel 220 may vary based on preference, manufacturing requirements, or required properties of the seal. For example, in some embodiments, as shown in FIGS. 3A and 3B, the follower seal 200 may be disposed on the follower 100 such that the channel opening 224 faces the same direction as the material contacting surface 112 of the follower 100. Such an arrangement may be advantageous because it allows greater compliance of the follower seal 200 as it contacts the sides of the container during movement of the follower 100 into the container.

As the follower 100 is moved into the container, the interaction between the follower 100 and the material in the container generates pressure that acts on the follower seal 200 to alter the contacting force between the seal and the container. This is sometimes referred to as a self-energizing seal. In embodiments where the opening 224 faces the insertion direction of the follower 100, the generated pressure is applied to the channel walls 232 and drives them apart, widening the opening 224. This increases the contact force between the follower seal 200 and the interior of the container in relation to the pressure within the container, the force with which the follower 100 is moved, and the width, depth, and shape of the channel 220. Such an arrangement results in increased contact force between the follower seal 200 and the interior of the container during operation, while also allowing for greater compliance of the same seal upon entry into the container.

In such embodiments, it may be preferable that the channel 220 is covered by at least a portion of the follower 100, for example by the groove 120. Referring to FIG. 3B, the follower seal 200 may be positioned within the groove 120 such that the first end 208 extends outside of the groove 120, while the second end 212 and the opening 224 are inside the groove 120. Placing the opening 224 of the channel 220 in the groove 120 helps protect the follower seal 200. As the follower 100 progresses into the container, and the first end 208 of the follower seal 200 contacts the container, the container walls exert shear forces onto the follower seal 200. Additionally, the follower seal 200 can catch on various protrusions, angled surfaces, or imperfections during movement. Placing the opening 224 outside of the groove 120 may be disadvantageous as it would provide an increased surface area and projection to snag on any of the above features on the container walls. This may tear, twist, dislodge, or otherwise damage the follower seal 200 or the follower 100.

This disclosure is not limited to any particular dimensions of the groove 120 or the channel 220, but it will be understood that in some embodiments the interaction and overlapping of the channel 220 and the groove 120 will necessitate appropriate sizing of either or both elements. In some embodiments, the opening 224 of the channel 220 may be between about 0.10 inches and 0.60 inches, between 0.25 inches and 0.45 inches, or combinations of the above. In an illustrative embodiment, the opening may be about 0.325 inches. Although this disclosure is not limited to a particular container, follower seals or often used with cylindrical 55-gallon drums designed to store and transport material.

In operation, the pump follower 100 is inserted into a container with material. The pump follower 100 is driven into the container as far as possible to prevent loss of material and waste. The follower seal 200, disposed peripherally around the follower 100, contacts the inside walls of the container and wipes the material from the walls. In some embodiments, multiple follower seals 200 are utilized, such that if the first follower seal 200 does not wipe all of the material, or if it is damaged or dislodged in the process, the second follower seal 200 provides a backup option.

Upon insertion of the pump follower 100 into the container, force must be applied to compress the follower seal 200 to fit into the opening of the container and, subsequently, the interior of the container. Traditional solid O-rings require excessive force to compress them upon entry of the follower 100 into the container. Alternatively, hollow O-rings are difficult to manufacture, as they require more steps of extruding the material, cutting, and joining it. The follower seal 200 as described in various embodiments throughout this disclosure offers greater compression that requires less force upon entry of the follower 100 into the container, and it is simpler to form and manufacture. If less force is needed to compress the follower seal 200, less energy is used upon insertion and progression of the follower 100 into the container. Additionally, smaller, weaker, and cheaper machinery may be utilized, thus saving space, costs, and maintenance for the user.

Improved compliance will depend, in part, on the material used, the shape and dimensions of the channel 220, and the width of the opening 224. As the follower seal 200 is compressed, the opening 224 shrinks, and the channel 220 decreases in volume. Once the compression of the seal causes the opening 224 to fully close, the follower seal 200 becomes significantly more rigid, similar to a traditional solid O-ring seal. As such, it would be advantageous in some embodiments to manufacture the follower seal 200 such that the opening 224 and/or channel 220 do not completely close during normal, expected operation.

The follower seal 200 described throughout this disclosure can be manufactured to have various physical parameters. If greater compliance is desired, for example, the channel 220 may be made larger, the opening 224 may be formed wider, the cross-sectional shape of the channel 220 can be changed, and other specifications of the follower seal 200 may be altered. Alternatively, if a stiffer seal is needed, the size of the channel 220 may be decreased, the opening 224 may be shrunk, and/or other parameters may be changed. The ease of manufacturing various fastener seals to meet specific demands and provides an advantage over existing solutions.

The follower seal 200 may be manufactured in any acceptable standard method of creating sealing rings, like O-rings, and the channel 220 may be formed by molding the seal in or on a mold. In some embodiments, for example, a wedge-shaped mold member may be used to form the channel 220 in the seal.

The present disclosure is not limited to follower seals composed of particular compositions. Suitable materials include, but are not limited to, ethylene propylene diene monomer (EPDM), silicone, neoprene, Viton, butyl rubber, nitrile rubber, other suitable materials used for manufacturing sealing components, or combinations of the above.

Depending on the material used in manufacturing, the follower seal 200 may have various levels of hardness. In some embodiments, the follower seal 200 may have a hardness between about 40 and about 90 on the Shore A scale, between about 50 and about 80, between about 60 and about 70, or combinations of the above. In an illustrative embodiment, the follower seal 200 may have a hardness of about 70 on the Shore A scale. If the seal has a substantially lower hardness material (softer), it would offer greater compliance when compressive forces act on it, but it would also have increased drag on the surfaces of the container, be less durable and more prone to snagging or tearing, and could be more expensive to manufacture and/or maintain.

The follower seal 200 as disclosed throughout this specification can be used with new machinery or with various existing technology, including, for example, existing followers 100. It will be understood that a pump follower 100 may be retrofitted to include one or more follower seals 200, either in place of or in addition to other sealing elements, such as traditional solid or hollow O-rings or other suitable sealing components.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims.

What is claimed is:

1. A pump follower configured to be implemented in a container storing a material, the pump follower comprising:

a body configured to be inserted into the container, the body having a material contacting surface configured to contact the material in the container and a peripheral surface substantially perpendicular to the material contacting surface;

a tool interface and/or a passage;

a groove defined on the peripheral surface of the body;

a sealing element disposed in the groove and configured to slidably contact an inner surface of the container; and a channel defined within the sealing element, wherein the sealing element is configured to be compressed when the pump follower is inserted into the container, such that the channel decreases in size;

wherein the pump follower is configured to remove material from a container in conjunction with the tool interface and/or the passage and the tool interface and/or the passage are configured to provide a passage through which material can move;

wherein the sealing element has a hemispherical first side configured to contact the container, and a flat second side configured to contact the groove;

wherein the sealing element comprises a substantially D-shaped cross-sectional shape;

wherein the channel in the sealing element is disposed closer to the flat second side of the sealing element than to the hemispherical first side;

wherein the channel of the sealing element comprises a V-shaped cross-sectional shape;

wherein the channel defines an opening on an outer surface of the sealing element, a floor opposite the opening, a first wall extending from the floor to the opening, and a second wall opposite the first wall extending from the floor to the opening; and wherein the first wall and second wall extend a same distance from the floor to the opening in a cross-section of the channel.

2. The pump follower of claim 1, wherein a cross-section of the channel is symmetrical.

3. The pump follower of claim 1, further comprising the tool interface, wherein:

the tool interface is configured to attach to a pump configured to move material from the container;

the opening has a width defined between the first wall and the second wall, the channel has a depth defined between the opening and the floor; and the channel has an opening angle defined by a position of the first wall relative to the second wall.

4. The pump follower of claim 3, further comprising a passage configured to guide the material from the container, wherein the opening is between about 0.10 inches and 0.60 inches;

wherein the sealing element comprises a diameter of between 6 inches and 30 inches; and wherein the sealing element is configured to wipe material on sides of the container.

5. The pump follower of claim 4, wherein the groove is defined by a side wall of the follower and comprises a substantially rectangular shape; and wherein the opening is between about 0.25 inches and 0.45 inches.

6. The pump follower of claim 5, wherein the opening is about 0.325 inches.

7. The pump follower of claim 1, wherein:

a cross-section of the container is round, the body is substantially cylindrical, and an outer diameter (OD) of the body is slightly smaller than an inner diameter (ID) of the container;

and the sealing element is configured to be self-energizing.

8. The pump follower of claim 1, wherein the pump follower includes a plurality of grooves defined by the peripheral surface and the pump follower comprises a plurality of the sealing element each disposed in one of the plurality of grooves.

9. The pump follower of claim 1, further comprising the tool interface, wherein the tool interface is configured to attach to a tool; and wherein the groove is defined by a side wall of the follower and comprises a substantially rectangular shape.

10. The pump follower of claim 9, wherein the sealing element comprises a diameter of between 6 inches and 30 inches.

11. The pump follower of claim 1, wherein the groove is defined by a side wall of the follower and comprises a substantially rectangular shape; and wherein the sealing element is disposed such that when the pump follower is inserted into the container, the opening faces a direction of insertion of the pump follower into the container.

12. The pump follower of claim 1, wherein the groove is defined by a side wall of the follower and comprises a substantially rectangular shape; and wherein the sealing element is disposed in the groove such that the channel is entirely within the groove.

13. The pump follower of claim 1, wherein the sealing element comprises an elastomer having a hardness on a Shore A durometer scale between about 40 and about 80.

14. A sealing element configured to be implemented with a pump follower, the sealing element comprising:

a body having an outer surface, a first side, and a second side; and a channel defined within the body, the channel having an opening defined on the outer surface of the body between the first side and the second side, a floor opposite the opening, a first wall extending from the floor to the opening, and a second wall opposite the first wall extending from the floor to the opening, wherein the sealing element is configured to be compressed when the pump follower is inserted in a container such that the first side moves closer to the second side and the channel decreases in size;

wherein the pump follower is configured to remove material from a container in conjunction with a tool interface and/or a passage;

wherein the first side includes a substantially hemispherical portion, and the second side includes a substantially flat portion;

wherein the sealing element comprises a substantially D-shaped cross-sectional shape;

wherein the first wall is not parallel to the second wall, and a distance between the first wall and the second wall is largest at the outer surface and smallest adjacent to the floor; and wherein the first wall and second wall extend a same distance from the floor to the opening in a cross-section of the channel.

15. The sealing element of claim 14, wherein:

the sealing element comprises a diameter of between 6 inches and 30 inches;

the sealing element is configured to wipe material on sides of the container; and the opening is between about 0.10 inches and 0.60 inches; and the sealing element is configured to be self-energizing.

16. The sealing element of claim 15, wherein the opening is between about 0.25 inches and 0.45 inches; and wherein the channel of the sealing element comprises a V-shaped cross-sectional shape.

17. The sealing element of claim 16, wherein the opening is about 0.325 inches wide between the first wall and the second wall.

18. A pump follower comprising the sealing element of claim 14, wherein the tool interface and/or the passage are configured to provide a passage through which material can move; and wherein the channel of the sealing element comprises a V-shaped cross-sectional shape.

19. A pump follower comprising the sealing element of claim 14, further comprising the tool interface, wherein:

the tool interface is configured to attach to a tool.

20. A pump follower comprising the sealing element of claim 14, further comprising the passage, wherein the sealing element is configured to be disposed within a groove on the pump follower, such that the second side contacts the groove and the first side extends outside the groove;

wherein the groove is defined by a side wall of the pump follower and comprises a substantially rectangular shape;

wherein the sealing element is a ring; and wherein the passage is configured to provide a passage through which material can move.

21. A pump follower comprising the sealing element of claim 14, wherein the sealing element is configured to be disposed within a groove on the pump follower, such that the second side contacts the groove and the first side extends outside the groove; and wherein the sealing element is configured to wipe material on sides of the container.

22. A pump follower comprising the sealing element of claim 14, further comprising the tool interface and the passage.

23. The sealing element of claim 14, wherein the sealing element comprises an elastomer having a hardness on a Shore A durometer scale between about 40 and about 80.

* * * * *